US007194379B1

(12) United States Patent
Chivers

(10) Patent No.: US 7,194,379 B1
(45) Date of Patent: Mar. 20, 2007

(54) HIGH RESOLUTION TOA CIRCUIT

(75) Inventor: Mark A. Chivers, Mckinney, TX (US)

(73) Assignee: L3 Communications Integrated Systems L.P., Greenville, TX (US)

( * ) Notice: Subject to any disclaimer, the term of this patent is extended or adjusted under 35 U.S.C. 154(b) by 0 days.

(21) Appl. No.: 11/372,817

(22) Filed: Mar. 10, 2006

(51) Int. Cl.
*G06F 15/00* (2006.01)

(52) U.S. Cl. ........................................................ 702/176

(58) Field of Classification Search .................. 702/66, 702/74, 79, 176, 187, 190, 193, 182; 370/335, 370/342; 375/206, 349; 708/300, 313; 341/141, 341/152; 455/403, 404
See application file for complete search history.

(56) References Cited

U.S. PATENT DOCUMENTS 3,754,236 A * 8/1973 Dotson, Jr. ................. 341/122
4,586,005 A 4/1986 Crawford
5,075,880 A * 12/1991 Moses et al. ............... 708/313
5,815,419 A 9/1998 Fujitomi et al.
5,987,392 A * 11/1999 Tucker et al. ................. 702/66
6,687,315 B2 2/2004 Keevill et al.
6,763,072 B1 7/2004 Matsui et al.

* cited by examiner

*Primary Examiner*—Bryan Bui
(74) *Attorney, Agent, or Firm*—Hovey Williams LLP

(57) ABSTRACT

An interpolation circuit (10) generates a plurality of intermediate amplitude values linearly related to two consecutive signal amplitude values using a system of adders and memory elements. A first stage (64) of the interpolation circuit calculates a one-half amplitude value; a second stage (66) calculates one-fourth and three-fourths amplitude values, and a third stage (68) calculates one-eighth, three-eighths, five-eighths, and seven-eighths amplitude values. A comparator (14) receives a threshold value (32) and compares each of the intermediate amplitude values to the threshold value. A decoder (16) generates a time of arrival adjustment value that is subtracted from a low resolution time of arrival to generate a high resolution time of arrival.

30 Claims, 8 Drawing Sheets

HIGH RESOLUTION TOA CIRCUIT

BACKGROUND OF THE INVENTION

1. Field of the Invention

The present invention relates to a circuit and method for determining a time of arrival of a signal event. More particularly, the present invention involves a circuit for estimating an arrival time of a signal pulse edge by calculating a plurality of intermediate amplitude values between a first signal sample and a second signal sample and interpolating the arrival time by comparing each of the plurality of intermediate values to a threshold value.

2. Description of Prior Art

Radio frequency (RF) signal receivers and other receivers use analog-to-digital converters (ADCs) to capture signal samples for processing. Such ADCs are typically driven by a receiver system clock, and thus capture samples at a rate equal to the frequency of the system clock. A circuit that determines a time of arrival (TOA) of a signal event, such as a rising edge of the signal, relies on the samples generated by the ADC and is thus limited in operation to the system clock rate.

By way of example, and referring to FIG. 1, a receiver with an 80 MHz system clock captures consecutive signal samples N and N+1, wherein the elapsed time T between samples N and N+1 is equal to the period of the system clock, or 12.5 ns. Therefore the TOA resolution is about 12.5 ns. It will be appreciated that if the first sample to indicate occurrence of the event is N+1, the receiver will assign an arrival time equal to N+1 even though the event could have occurred at any time between N and N+1. Thus, the TOA error could be nearly 12.5 ns.

One method of increasing the resolution of the TOA involves the use of an additional analog-to-digital converter (ADC) sampling the RF signal at a higher frequency than the system clock to generate one or more amplitude samples during the time T between samples N and N+1. With this method, the slower ADC running at the system clock speed captures samples used to detect when the signal has exceeded a threshold value to trigger a circuit to compare the most recent values generated by the fast ADC to the threshold value, thus more accurately determining the arrival time of the signal event.

This method suffers from various problems and limitations. First, the faster ADC requires dedicated analog-to-digital conversion circuitry, an additional clock, and storage elements (for storing recent values) among other things, all of which contribute to the size and power consumption of the overall circuit. Second, the additional clock must run the faster ADC at a higher frequency than the system clock and be synchronized with the system clock, adding to the complexity of the overall circuit.

Accordingly, there is a need for an improved TOA detection method that does not suffer from the problems and limitations of the prior art.

SUMMARY OF THE INVENTION

The present invention provides an improved circuit for determining the time of a arrival of a signal event. Particularly, the present invention provides a circuit for estimating an arrival time of a signal pulse edge by calculating a plurality of intermediate amplitude values between a first signal sample and a second signal sample and interpolating the arrival time by comparing each of the plurality of intermediate values to a threshold value.

According to a first embodiment of the invention, a system for determining the arrival time of a signal event comprises an intermediate value calculator, a comparator, and a decoder. The intermediate value calculator receives two samples of the signal, wherein a first sample includes a first amplitude value and a first time of arrival and a second sample includes a second amplitude value and a second time of arrival, and defines a plurality of intermediate values between the first amplitude value and the second amplitude value.

The comparator receives a threshold value and the plurality of intermediate values, compares each intermediate value to the threshold value, and generates a comparison result. The decoder generates a time of arrival adjustment value based on the comparison result, the first time of arrival, and the second time of arrival.

According to a second embodiment of the invention, an electronic circuit for determining the arrival time of a signal event comprises a first stage, a second stage, and a third stage. The first circuit stage receives a first signal sample with a first amplitude value and a first time of arrival, receives a second signal sample with a second amplitude value and a second time of arrival, and determines a one-half amplitude value by adding the first and second amplitude values and dividing the result by two.

The second circuit stage determines a one-fourth amplitude value by adding the first amplitude value to the one-half amplitude value and dividing the result by two, and determines a three-fourths amplitude value by adding the second amplitude value to the one-half amplitude value and dividing the result by two. The third circuit stage compares the one-fourth, one-half, and three-fourths amplitude values to a threshold amplitude value and generates a time of arrival adjustment value based on the comparisons.

According to a third embodiment of the invention, the electronic circuit includes a system clock as well as first, second, and third circuit stages, wherein the system clock generates a clock signal characterized by clock events. The first stage includes a signal input, a first memory element for receiving a value from the signal input and storing the value upon the occurrence of a first clock event, and a first adder for receiving the stored value from the first memory element and a value from the signal input and adding the two values to generate a first added value.

The second stage includes second and third memory elements as well as second and third adders. The second memory element receives the first added value and stores the first added value upon the occurrence of a second clock event, and the third memory element receives the stored value from the first memory element and stores the value upon the occurrence of the second clock event. The second adder receives the stored values from the second and third memory elements and adds the two values to generate a second added value, and the third adder receives the stored values from the first memory element and the second memory element and adds the two values to generate a third added value.

The third stage includes fourth, fifth, sixth and seventh memory elements as well as fourth, fifth, sixth, and seventh adders. The fourth memory element receives the stored value from the third memory element and stores the value upon the occurrence of a third clock event, and the fifth memory element receives and stores a portion of the second added value upon the occurrence of the third clock event.

The fourth adder receives the stored values from the fourth and fifth memory elements and adds the values to generate a fourth added value. The sixth memory element receives the stored value from the second memory element and stores the value upon the occurrence of the third clock event. The fifth adder receives the stored values from the fifth an sixth memory elements and adds the values to generate a fifth added value.

The seventh memory element receives and stores a portion of the third added value upon the occurrence of the third clock event, and the sixth adder receives the stored values from the sixth and seventh memory elements and adds the values to generate a sixth added value. The seventh adder receives the stored values of the third and seventh memory elements and generates a seventh added value.

These and other important aspects of the present invention are described more fully in the detailed description below.

BRIEF DESCRIPTION OF THE DRAWINGS

An embodiment of the present invention is described in detail below with reference to the attached drawing figures, wherein.

DETAILED DESCRIPTION OF A PREFERRED EMBODIMENT

Figure 2:
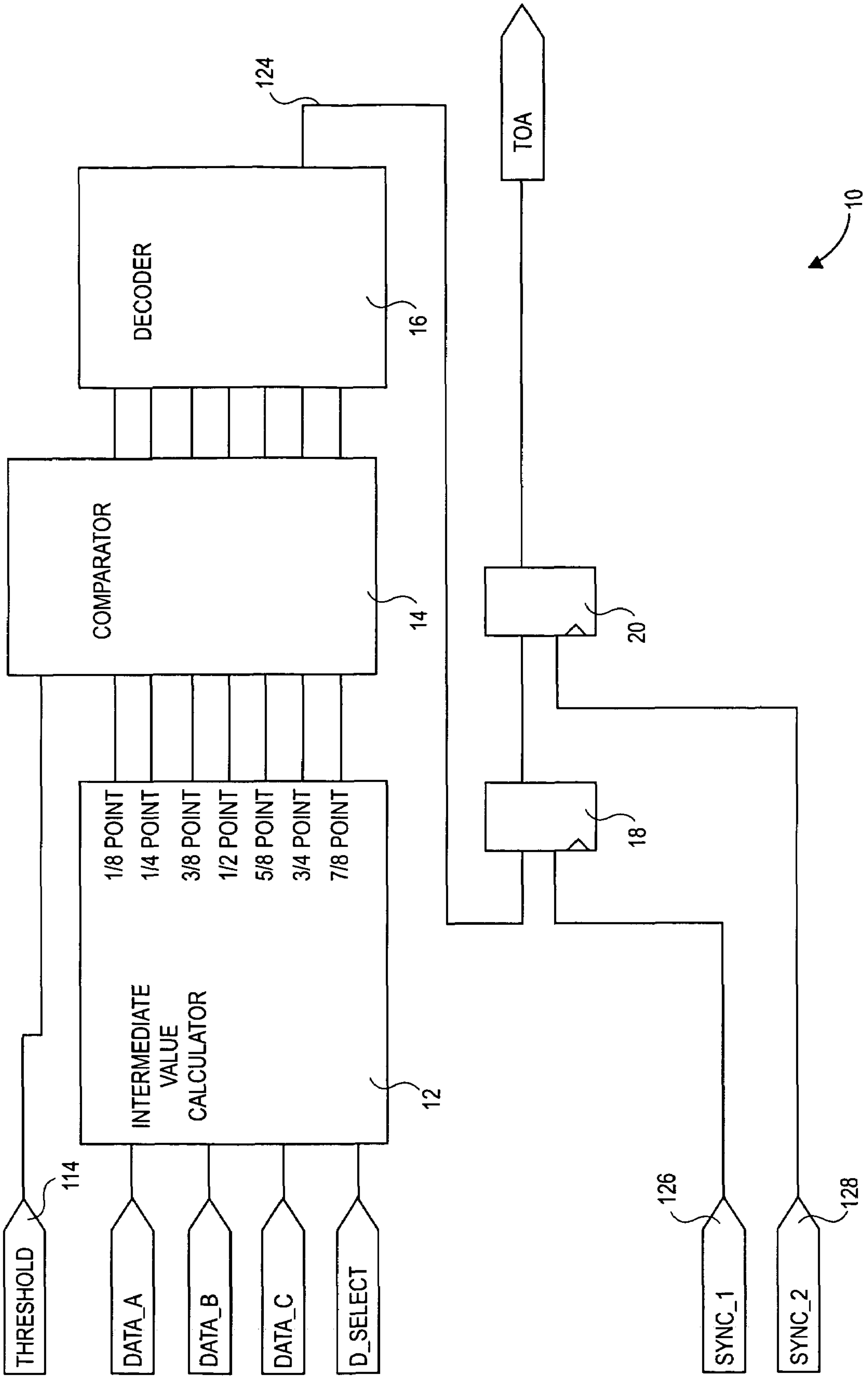
FIG. 2 is a bock diagram of an interpolation circuit operable to generate a plurality of intermediate values linearly related to the two samples of FIG. 1.

A preferred embodiment of a high-resolution time of arrival interpolation circuit incorporating principles of the present teachings is illustrated in FIG. 2 and designated generally by the reference numeral 10. The interpolation circuit 10 broadly comprises an intermediate value calculator 12, a comparator 14, a decoder 16, a capture memory element 18, and a hold memory element 20.

Figure 3:
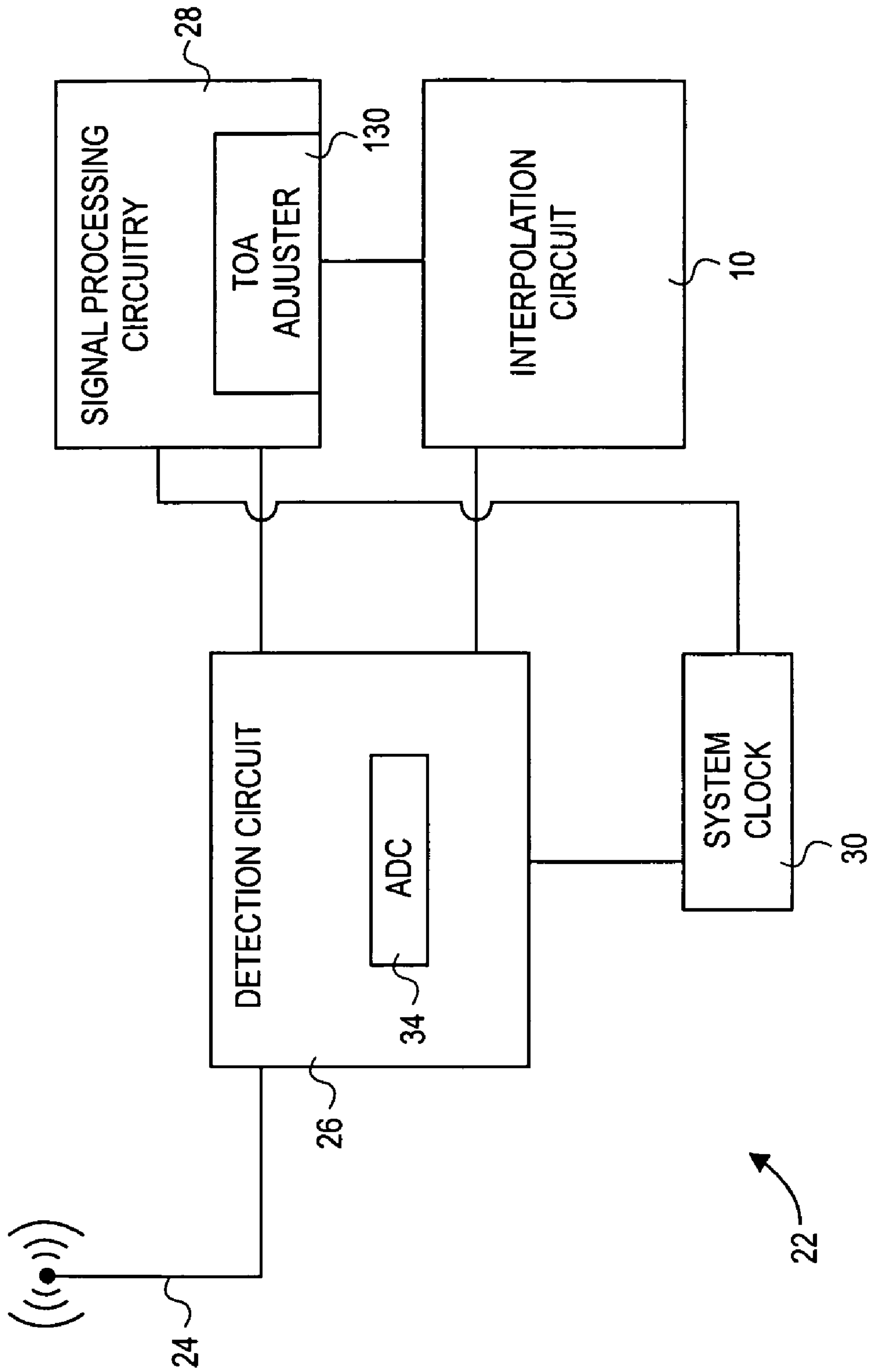
FIG. 3 is a bock diagram of a receiver system implementing the interpolation circuit of FIG. 2.

Referring also to FIG. 3, the interpolation circuit 10 forms part of a receiver system 22 that includes an antenna 24 for receiving broadcast radio signals; a detection circuit 26 for receiving signals from the antenna 24 and preparing the signals for use by other elements of the receiver system 22; the interpolation circuit 10; signal processing circuitry 28 for receiving signal data from the detection circuit 26 and the interpolation circuit 10 and processing the data to extract information; and a system clock 30. The antenna 24, detection circuit 26, and signal processing circuitry 28 are substantially conventional in nature and are only exemplary components of the receiver system 22, which may include other components.

The detection circuit 26 performs various operations on the signal received from the antenna 24 before communicating it to the signal processing circuitry 28 and the interpolation circuit 10. For example, the detection circuit 26 converts the signal to a digital format, creates a threshold value 32 for use in identifying a signal event, and generates one or more synchronization signals to synchronize the signal processing circuitry 28 and the interpolation circuit 10 with the signal event.

The detection circuit 26 includes an analog-to-digital converter (ADC) 34 for converting the signal received from the antenna 24 from an analog form to a digital form for digital processing. The ADC 34 samples the signal received from the antenna 24 to generate a series of digital values representing an amplitude of the signal at different points in time. The detection circuit 26 then filters the digital values generated by the ADC 34 by averaging consecutive signal values which can, for example, remove noise spikes from the signal to avoid false indications of a signal event. The detection circuit 26 may use two, four, or eight samples of the digital signal to generate two-point, four-point, or eight-point averaged data, respectively, where an averaged data value is the average of the sampled values.

More particularly, the detection circuit 26 may generate two-point averaged data by summing two consecutive sample values and dividing by two; four-point averaged data by summing four consecutive sample values and dividing by four, and eight-point averaged data by summing eight consecutive sample values and dividing by eight. The series of digital values generated by the ADC 34 thus are replaced by a series of averaged (filtered) values that will hereinafter be referred to collectively as the “digital signal,” wherein a “sample” of the digital signal has reference to one of the averaged values.

The detection circuit 26 is operable to selectively communicate the digital signal to the interpolation circuit 10 and the signal processing circuitry 28 in one of a plurality of formats, and preferably as two-point, four-point, or eight-point averaged data. For example, the detection circuit 26 may provide a two-point averaged data output as “DATA_A,” a four-point averaged data output as “DATA_B,” and an eight-point averaged data output as “DATA_C,” wherein all three outputs are communicated to the interpolation circuit 10 (see FIG. 2) and to the signal processing circuitry 28. The detection circuit 26 also provides a data select signal indicating in which format the data should be received. If, for example, the detection circuit 26 calculates the threshold value 32 (as described below) using two-point averaged data, the data select signal would indicate that DATA_A should be used.

The detection circuit 26 calculates the threshold value 32, which is used to determine when a rising edge, falling edge, or other signal event has occurred. The threshold value typically corresponds to one-half of the average measured voltage of the signal or one-half of the average measured power of the signal, and can be calculated using the two-point, four-point, or eight-point averaged data values. By way of example, the threshold value may be the average amplitude of the previous one-hundred samples of the digital signal, or may be the average amplitude of all samples over a period spanning a specific number of signal events, such as the two most recent leading edges of signal pulses. The detection circuit 26 communicates the threshold value to the interpolation circuit 10 for use in generating a high resolution time of arrival value, as explained below in greater detail.

The detection circuit 26 also generates one or more synchronization signals to synchronize operation of the signal processing circuitry 28, interpolation circuit 10, or both, with a detected signal event. The detection circuit 26 may detect, for example, a leading or trailing edge (or both) of a signal pulse by monitoring samples of the digital signal. For example, the detection circuit 26 may detect a rising edge on the digital signal by comparing an amplitude value corresponding to the sample N+1 with the threshold value 32 and determining that the amplitude value is greater than the threshold value 32. When the detection circuit 26 has detected a rising edge, it asserts the first synchronization signal after a pre-determined delay to notify the interpolation circuit 10 that a leading pulse edge has been detected and, therefore, the data being communicated to the interpolation circuit 10 may be used to determine a time of arrival of the rising edge. The detector circuit 26 asserts the second synchronization signal when it subsequently detects a falling edge on the digital signal to notify the interpolation circuit 10 and the signal processing circuitry 28 that a trailing pulse edge has been detected. The first synchronization signal is communicated to the interpolation circuit 10 as "SYNC_1" and the second synchronization signal is communicated to the interpolation circuit 10 as "SYNC_2," illustrated in FIG. 2.

The receiver system 22 is preferably implemented at least partially in an integrated circuit and is adapted to receive an RF signal in a conventional manner. The interpolation circuit 10 is preferably implemented at least partially in a field programmable gate array (FPGA), or other programmable logic device. It will be appreciated, however, that the present invention is not limited to a particular circuit construction methodology or use with a particular type of signal or a particular signal frequency. The interpolation circuit 10, for example, may be implemented in an application specific integrated circuit (ASIC), and may be used to detect signals in any of a variety of environments, including wired or wireless communications operating at substantially any frequency. Furthermore, the receiver system 22, or a portion thereof, may be implemented with one or more discrete circuit components.

Figure 1:
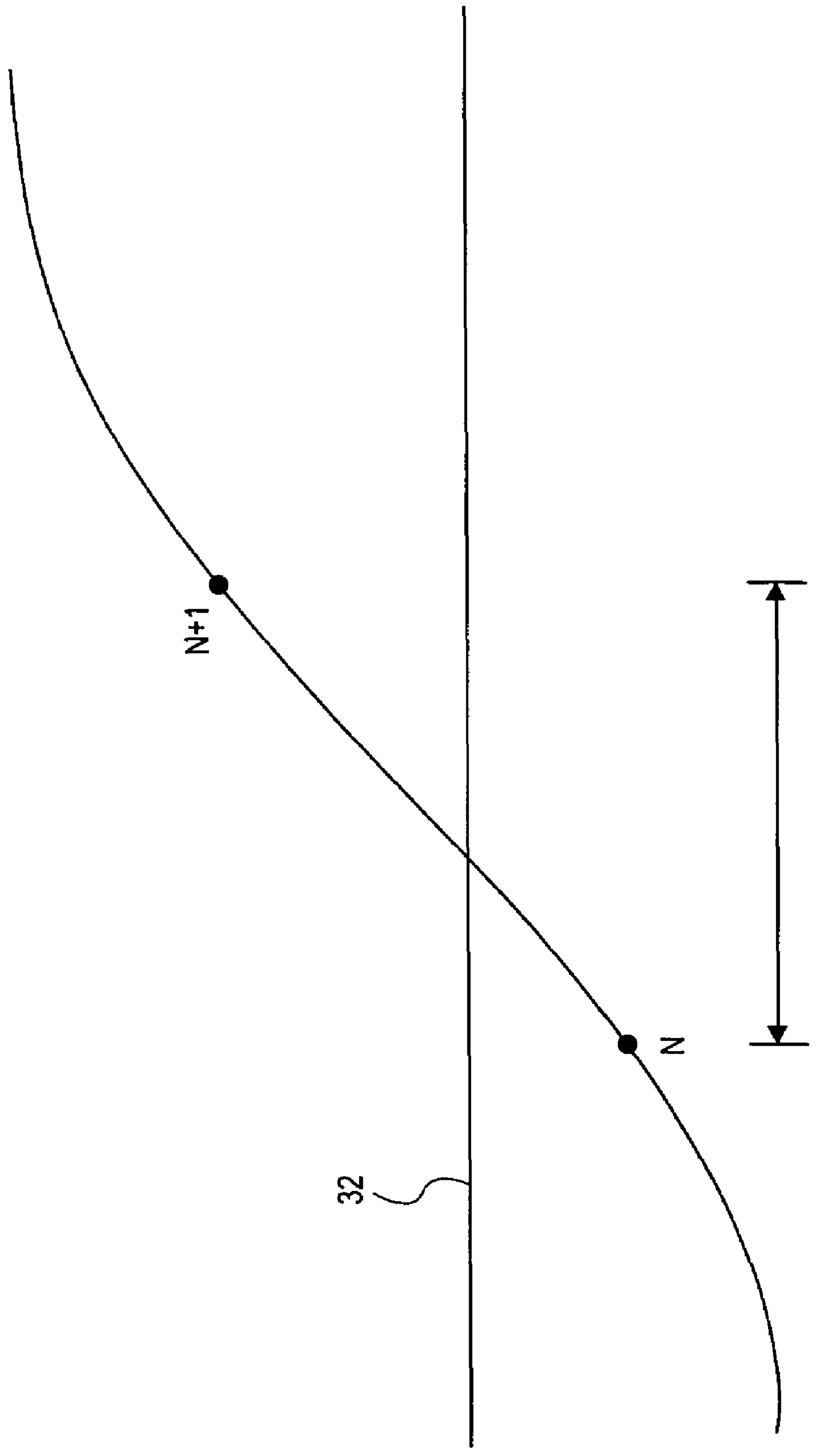
FIG. 1 (PRIOR ART)
FIG. 1 is a graphical illustration of an analog signal crossing a threshold value, and a first signal sample captured prior to the signal crossing the threshold value and a second signal sample captured after the signal has crossed the threshold value.

As explained above, the detection circuit 26 detects a time of arrival of a leading edge or a trailing edge of a signal when the signal crosses the threshold value 32. Because the ADC 34 samples the signal at the system clock 30 rate, prior art systems would record the time of arrival of the signal illustrated in FIG. 1 as the time corresponding to the sample N+1, which may differ significantly from the actual time of arrival, sometimes by nearly 12.5 ns.

Figure 4:
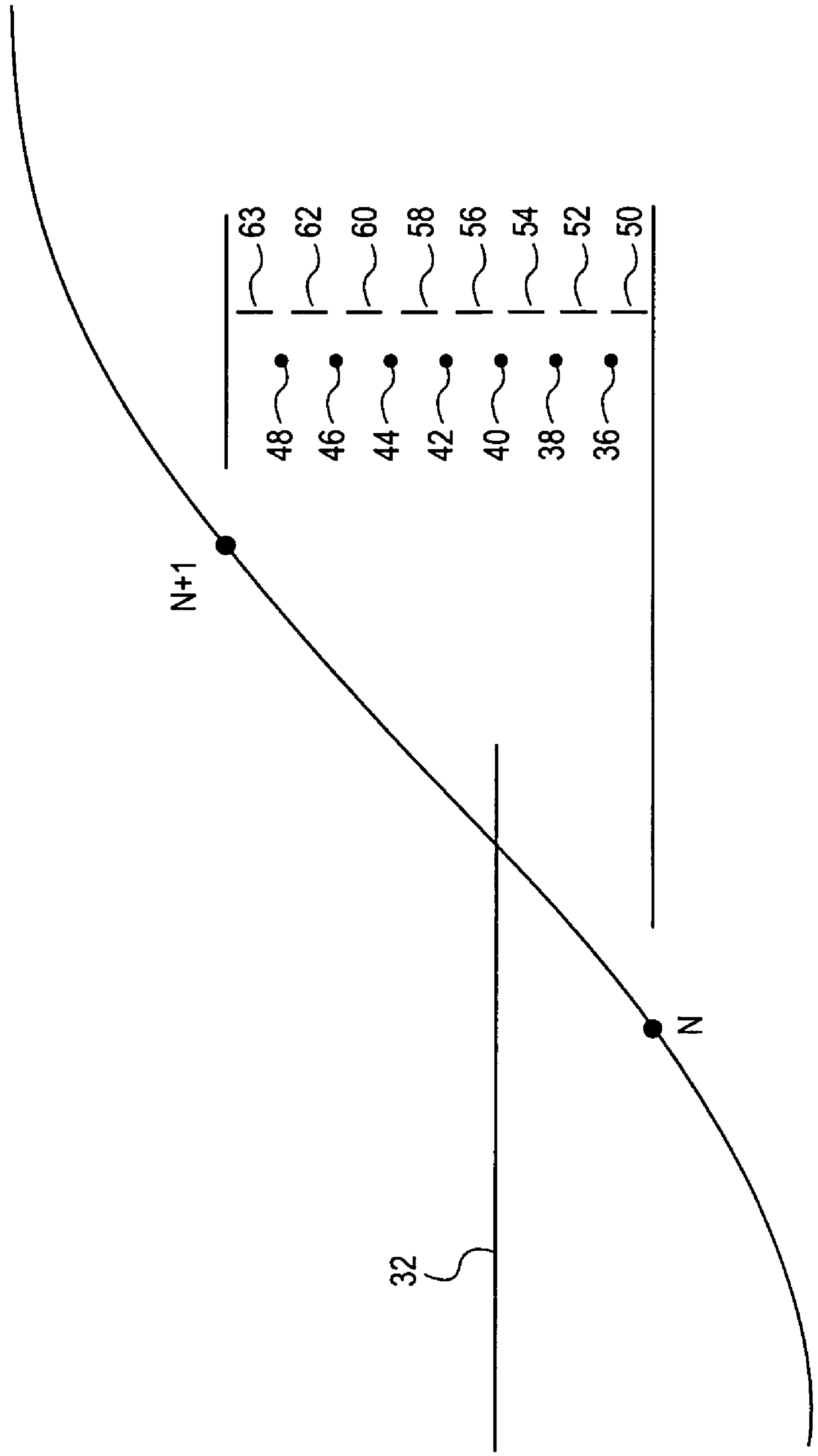
FIG. 4 is the graphical illustration of FIG. 1, showing a graphical relationship between the intermediate values generated by the interpolation circuit and the two sample values.

To increase the resolution of the time of arrival determined by the signal processing circuitry 28, the circuit 10 interpolates a plurality of amplitude values between the measured amplitude values from samples N and N+1 (see FIG. 1) and estimates a high resolution time of arrival by comparing each of the interpolated values to the threshold value 32. Referring to FIG. 4, the circuit 10 calculates a plurality of intermediate values 36,38,40,42,44,46,48 that are linearly-related to the first sampled amplitude value and the second sampled amplitude value and define a plurality of intervals 50,52,54,56,58,60,62,63 between the intermediate values. For example, if the first amplitude value is 0V and the second amplitude value is 0.8V, the intermediate values are evenly spaced at 0.1V, 0.2V, 0.3V, 0.4V, 0.5V, 0.6V, and 0.7V. The circuit 10 then compares the threshold value to each intermediate value to determine to which interval the threshold value pertains.

Figure 5:
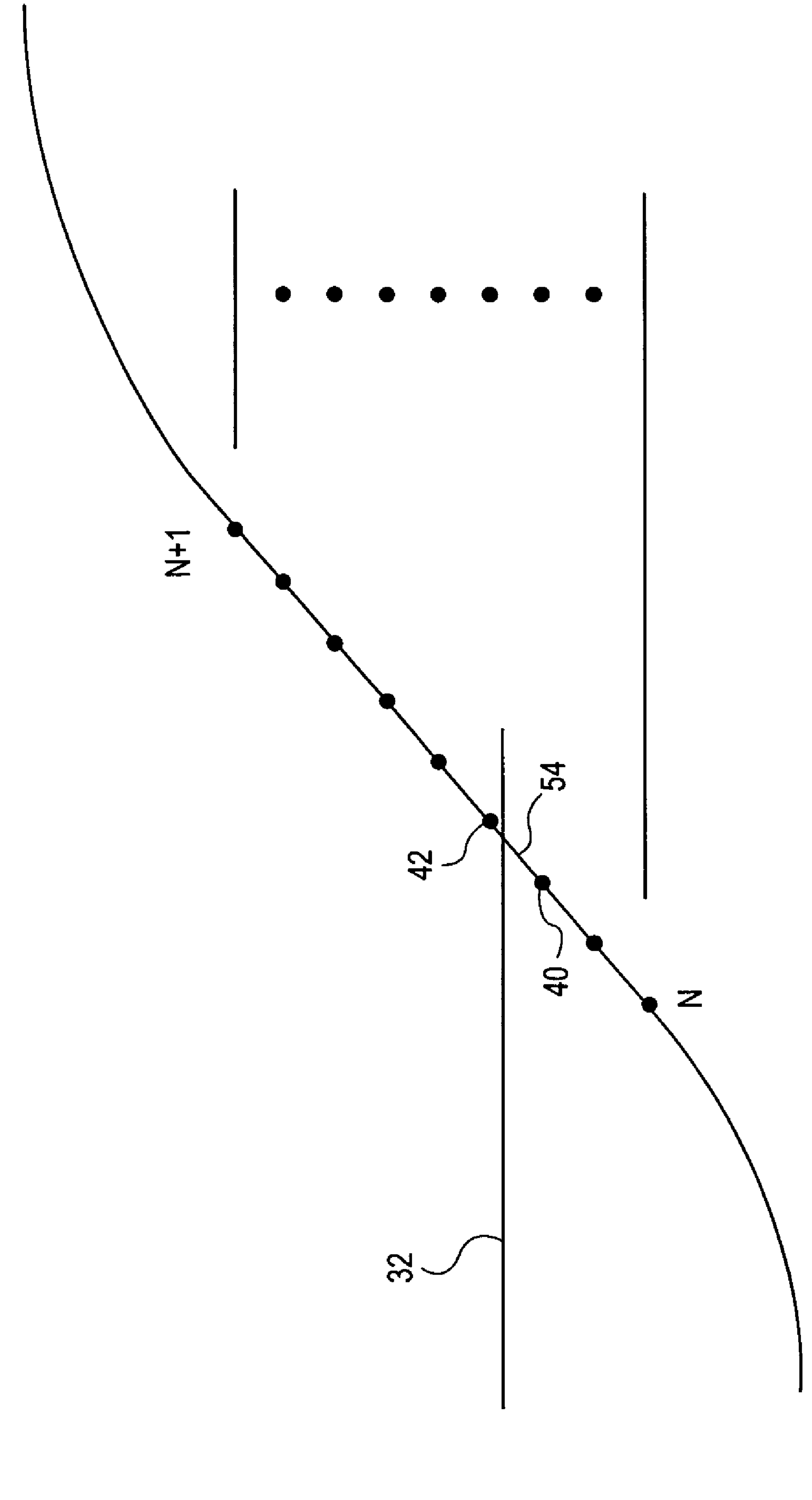
FIG. 5 is the graphical illustration of FIG. 4, further showing the intermediate values projected onto a straight line joining the two signal samples.

FIG. 5 illustrates the intermediate values projected onto a straight line connecting points N and N+1. If the threshold value 32 is less than the interpolated value 42 and is more than the interpolated value 40, the threshold value 32 pertains to the interval 54 and the higher-resolution time of arrival is the time corresponding to the intermediate value 42.

The time corresponding to the intermediate value 42 is an estimate based on the difference between the time of arrival associated with N and the time of arrival associated with N+1. Because N and N+1 correspond to consecutive events of the system clock 30 (such as consecutive rising edges), the time difference between samples N and N+1 is equal to one clock period T, which is 12.5 ns with an 80 MHz system clock. There are eight total intervals between samples N and N+1, and five of the intervals are between sample N+1 and the threshold value. Therefore, the high resolution time of arrival is estimated as the time of arrival of N+1 less ($5/8 \times T$).

The interpolation circuit 10 includes a system of adders and memory elements. It will be appreciated that the circuit 10 as illustrated and described is exemplary, and not limiting, in nature, and that the illustrated circuit elements may be substituted with similar elements without departing from the scope of the claimed invention.

Figure 6:
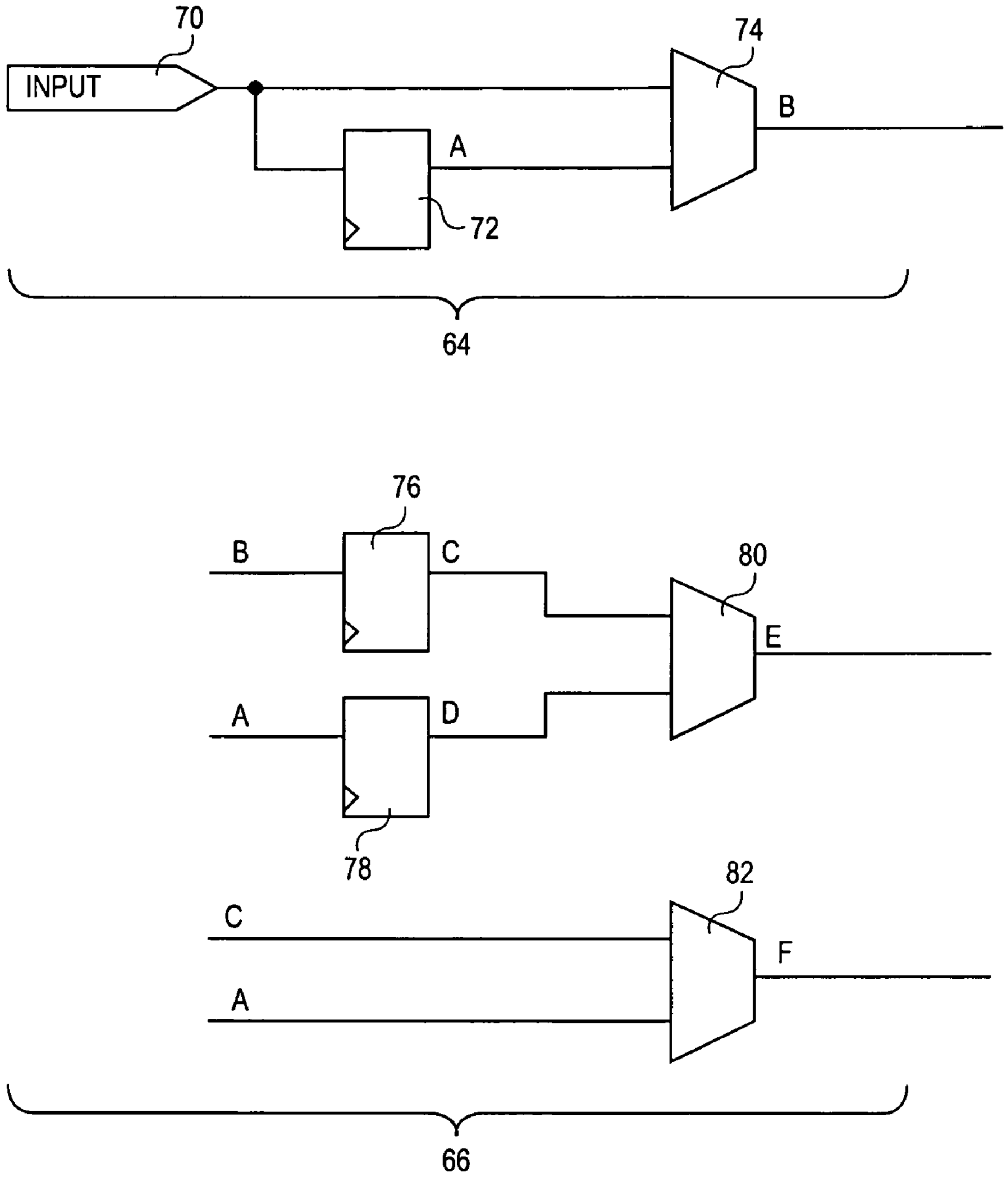
FIG. 6 is a schematic diagram of two stages of an intermediate value calculator of the interpolation circuit of FIG. 2.
Figure 7:
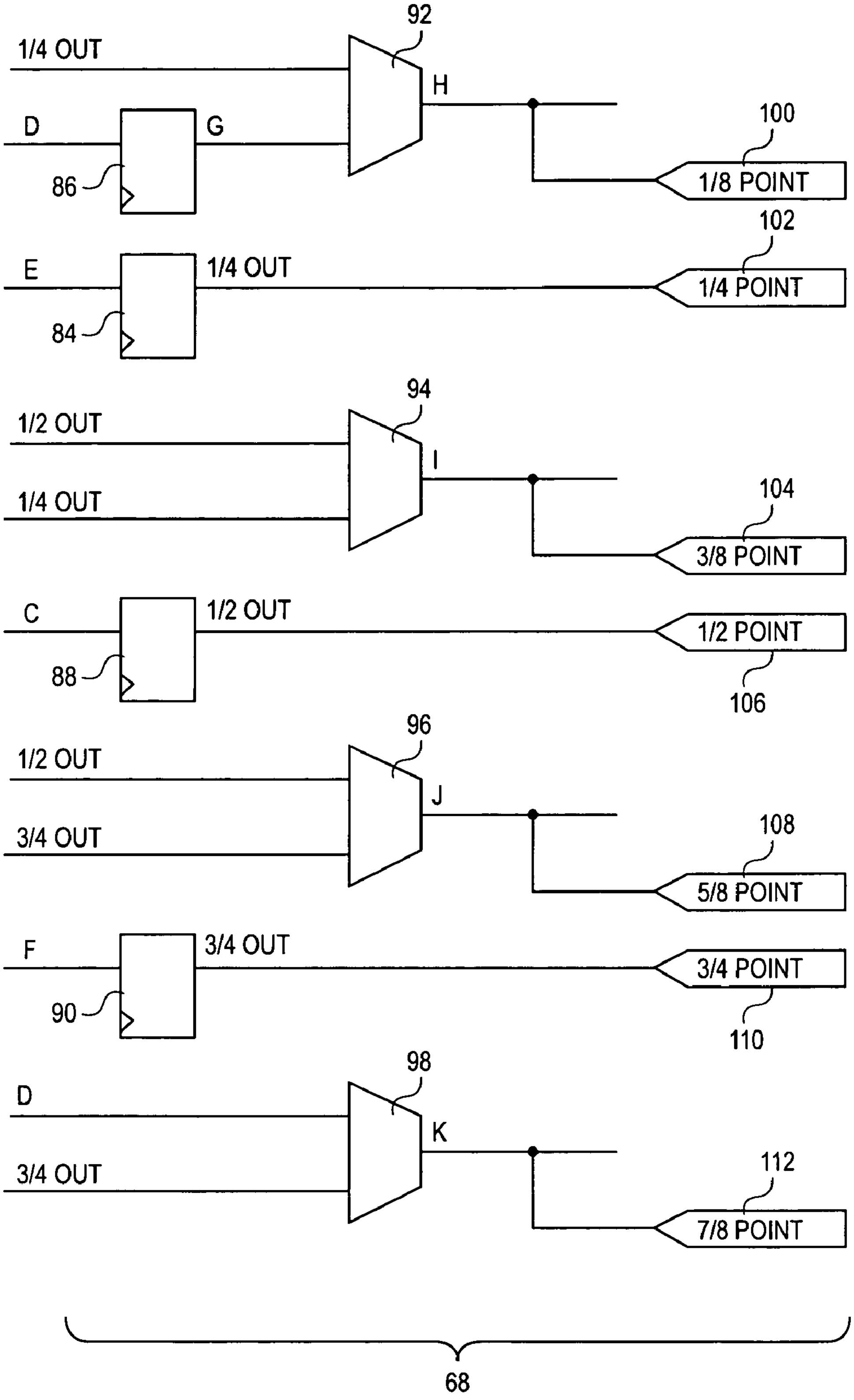
FIG. 7 is a schematic diagram of a third stage of the intermediate value calculator of FIG. 6.

Referring now to FIGS. 6 and 7, the circuit 10 comprises three stages 64,66,68. Each stage includes one or more circuit elements that can be grouped according to clock event, such that the useful output of each stage corresponds to a clock cycle. The output of a first stage 64, for example, is used after a first clock cycle; the output of a second stage 66 is used after a second clock cycle; and the output of a third stage 68 is used after a third clock cycle. In the illustrated embodiment, each stage corresponds to a single clock event, and consecutive stages correspond to consecutive clock events. The term "stage" as used herein is not so limiting, however, and a portion of a circuit referred to as a "first stage" may chronologically precede or follow a portion of a circuit referred to as a "second stage" or a "third stage."

Each stage 64,66,68 includes one or more memory elements and one or more adders. Each memory element is a D-type flip-flop with a fourteen-bit input, a fourteen-bit output, and a clock signal input. A flip-flop stores the input value upon the occurrence of a clock event, such as a rising edge of a clock signal. The stored value is presented on the output, and does not change until a new input is stored upon the occurrence of another clock event. The flip-flops may include other features not shown including, for example, an inverted output and an enable input.

Each adder includes two fourteen-bit inputs and a fifteen-bit output, wherein the output represents a sum of the inputs and includes a carry bit as the most significant bit. The adders are combinatorial circuits that are conventional in nature and may be constructed according to any of various methodologies without departing from the scope of the claimed invention. It should be noted that the interpolation circuit 10 is not limited to memory elements and adders of the size described above, buy may one or more circuit elements that accommodate more or fewer bits according to particular implementations of the invention.

The first stage 64 of the intermediate value calculator 10 includes a signal input 70, a first memory element 72, and a first adder 74. The sample input 70 receives a digital signal sample and communicates the sample to the first memory element 72 and to the first adder 74. An output A of the first memory element 72 is also communicated to the adder 74, such that the adder 74 receives a current signal value from the signal input 70 as well as a previous signal value stored in the first memory element 72. Thus, the adder 74 adds the amplitude values of samples N and N+1 illustrated in FIG. 1. The output B of the adder 74 represents a sum of the signal magnitude values measured at times N and N+1.

From the foregoing it can be seen that two values are associated with each sample N and N+1: an amplitude value and a time of arrival. The amplitude value is the value communicated to the intermediate value calculator 10 via the sample input 70 as the signal sample. The time of arrival of a sample corresponds to the particular clock cycle in which the sample was captured. The time of arrival of N+1 is one clock cycle greater than the time of arrival of N.

The second stage 66 includes second 76 and third 78 memory elements as well as second 80 and third 82 adders. The second memory element 76 receives all but the least significant bit of the output B of the first adder 74 and presents the stored value on output C. Because the memory element 76 receives all but the least-significant bit of output B, it is receiving one-half of the value on output B, or the sum of the amplitude of sample N and the amplitude of sample N+1 divided by two. This value represents an estimate of the amplitude of the signal at a time half-way between the time of sample N and the time of sample N+1, hereinafter referred to as the one-half amplitude value.

The third memory element 78 receives the output A of the first memory element and presents the stored value on output D. Outputs C and D are communicated to the second adder 80, which sums the values and presents a fifteen-bit value on output E that is the sum of the two inputs. As explained above, the input to the second memory element 76 represents the one-half amplitude value. In the second stage, the output D of the third memory element 78 is the amplitude value of sample N, therefore, the second adder 80 receives as inputs the one-half amplitude value and the amplitude value of sample N and sums the two values, presenting the result on output E.

The third adder 82 receives as inputs the output C of the second memory element 76 and the output A of the first memory element 72. Output C is the one-half amplitude value, and output A is the amplitude value of sample N+1. Thus, the third adder 82 adds the one-half amplitude value to the amplitude value of sample N+1 and presents the sum on output F.

The third stage 68 includes fourth 84, fifth 86, sixth 88, and seventh 90 memory elements as well as fourth 92, fifth 94, sixth 96, and seventh 98 adders. The fourth memory element 84 receives all bits except for the least significant bit of the output E of the second adder 80, which represents a one-fourth amplitude value, therefore the output of the fourth memory element 84 is the one-fourth amplitude value. The fifth memory element 86 receives the output D of the third memory element 78 and generates an output G that is the amplitude value of sample N. The fourth adder 92 also receives the one-fourth amplitude value from the fourth memory element 84. The fourth adder 92 therefore sums the one-fourth amplitude value and the amplitude value of sample N and presents the result on output H, wherein the result is a fifteen-bit value representing a one-eighth amplitude value multiplied by two.

The sixth memory element 88 receives the output C of the second memory element 76, which is the one-half amplitude value, therefore the output of the sixth memory element 88 is the one-half amplitude value. The fifth adder 94 receives the one-fourth amplitude value from the fourth memory element 84 and the one-half amplitude value from the sixth memory element 88. The fifth adder 94 therefore sums the one-fourth amplitude value and the one-half amplitude value and presents the result on output I, wherein the result is a fifteen-bit value representing a three-eighths amplitude value multiplied by two.

The seventh memory element 90 receives all bits except for the least significant bit of the output F of the third adder 82, which represents the three-fourths amplitude value. The sixth adder 96 receives the one-half amplitude value from the sixth memory element 88 and the three-fourths amplitude value from the seventh memory element 90. The sixth adder 96 therefore sums the one-half amplitude value and the three-fourths amplitude value and presents the result on output J, wherein the result is a fifteen-bit value representing a five-eighths amplitude value multiplied by two.

The seventh adder 98 receives the output D of the third memory element 78 which is the amplitude value of the sample N+1. The seventh adder 98 also receives the three-fourths amplitude value from the seventh memory element 90. The seventh adder 98 therefore sums the three-fourths amplitude value and the amplitude value of the sample N+1 and presents the result on output K, wherein the result is a fifteen-bit value representing a seven-eighths amplitude value multiplied by two.

The seven outputs of the interpolation circuit 10 are illustrated on the right of FIG. 7, where a one-eighth point output 100 corresponds to all but the least significant bit of the output H of the fourth adder 92; a one-fourth point output 102 corresponds to the output of the fourth memory element 84; a three-eighths point output 104 corresponds to all but the least significant bit of the output I of the fifth adder 94; a one-half point output 106 corresponds to the output of the sixth memory element 88; a five-eighths point output 108 corresponds to all but the least significant bit of the output J of the sixth adder 96; a three-fourths point output 110 corresponds to the output of the seventh memory element 90; and a seven-eighths point output 112 corresponds to all but the least significant bit of the output K of the seventh adder 98.

Referring again to FIG. 2, each of the outputs of the intermediate value calculator 10 is communicated to the comparator 14, which also receives the threshold value 32 communicated from the detection circuit 26 via a threshold input 114. The comparator 14 compares each intermediate value to the threshold value 32 and generates seven outputs, each indicating whether one of the intermediate values is greater than the threshold value 32.

Figure 8:
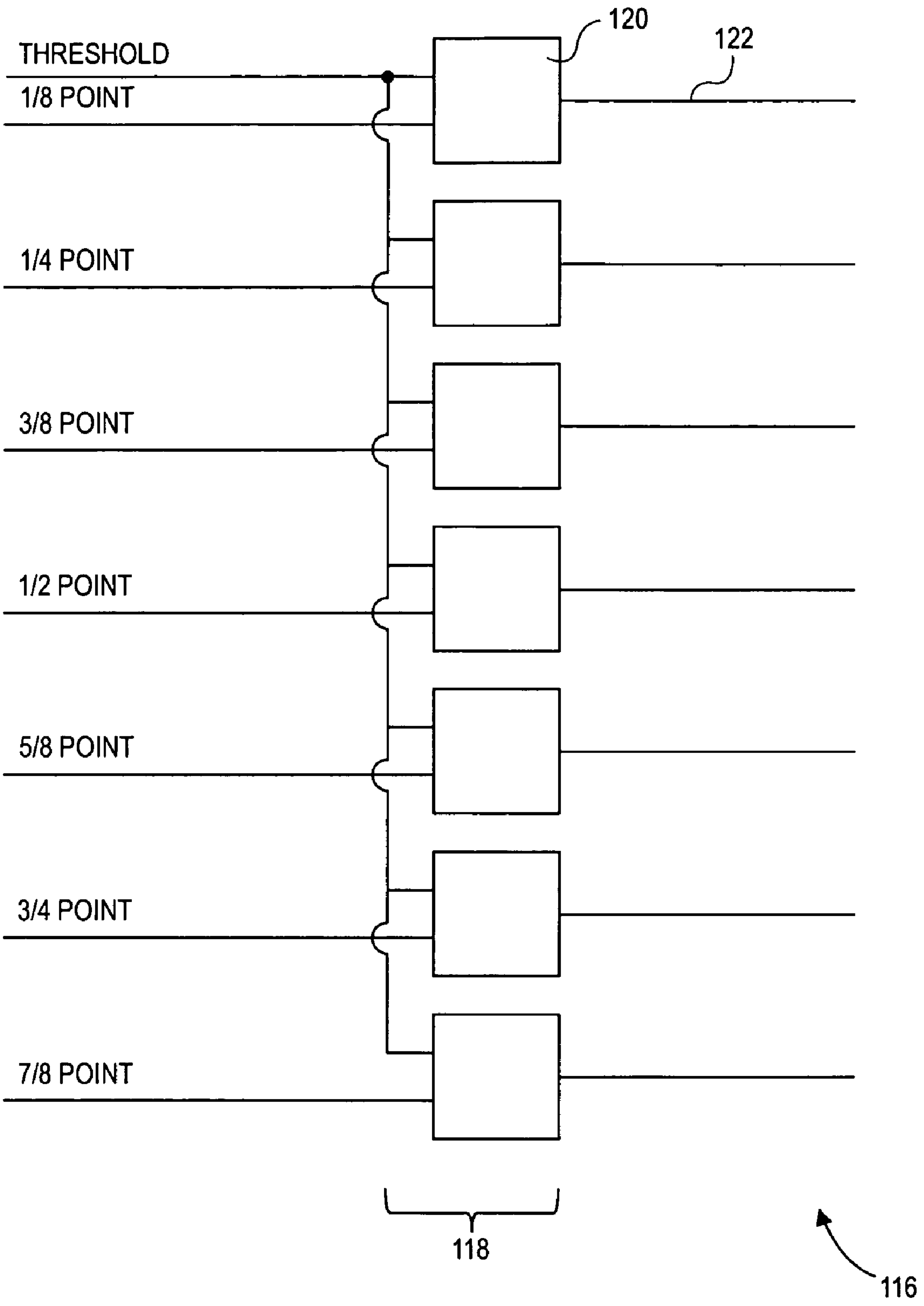
FIG. 8 is a schematic diagram of a comparator of the interpolation circuit of FIG. 2.

An exemplary comparator circuit 116 implementing the function of the comparator 14 is illustrated in FIG. 8, wherein the comparator circuit 116 includes seven digital comparators 118 each with two data inputs. Each digital comparator is a conventional, two-input, fourteen-bit comparator with a single-bit output that indicates whether the input received from the intermediate value calculator 12 is greater than or less than the threshold value 32. For example, a first digital comparator 120 receives the one-eighth point output 100 and the threshold value 32 and asserts a logical “1” on a corresponding output 122 if the one-eighth point value is greater than the threshold value 32 and asserts a logical “0” on the output 122 if the one-eighth point value is less than the threshold value 32.

The decoder 16 receives the output of the comparator 14 and generates a time of arrival adjustment value that represents a difference between the low-resolution time of arrival and the high-resolution time of arrival. Appendix A includes a block of hardware description language code that performs this function. A skilled artisan will recognize that the code segment identified as a table assigns one of eight values to a decoder output 124. If, for example, all of the input values are equal to a logical "1," the decoder 16 asserts the hexadecimal value "7" on the output 124, and if all of the inputs are equal to a logical "0," the decoder 16 asserts the hexadecimal value "0" on the output 124. If a portion of the input values are equal to a logical "1" and a portion are equal to a logical "0," the decoder 16 asserts a hexadecimal value between "1" and "6," inclusive, on the output 124.

The capture memory element 18 receives the time of arrival adjustment value from the decoder 16 and stores the value upon assertion of the SYNC_1 input 126. The SYNC_1 input 126 receives the first synchronization signal from the detection circuit 26 that is asserted a pre-determined time after the detection circuit 26 detects a rising edge to enable the capture memory element 18 to store the time of arrival adjustment value generated by the decoder 16. In the illustrated embodiment, the time of arrival adjustment value is present on the output 124 of the decoder 16 four clock cycles after a rising edge is detected by the detection circuit 26 because it takes that long for the N and N+1 sample values to move through the intermediate value calculator 12, comparator 14, and decoder 16.

The hold memory element 20 receives and stores the time of arrival adjustment value from the capture memory element 18 upon assertion of the SYNC_2 input 128. The SYNC_2 input 128 receives the second synchronization signal from the detection circuit 26 and is asserted when the detection circuit 26 detects a falling edge of the signal to enable the hold memory element 20 to capture the time of arrival adjustment value. The capture memory element 18 thus holds the time of arrival adjustment value corresponding to a rising edge from a first falling edge after the rising edge to a subsequent falling edge of the signal, i.e., from a trailing edge of a first signal pulse to a trailing edge of a second signal pulse.

This value is communicated to the signal processing circuitry 28, which includes a time of arrival adjuster 130. The time of arrival adjuster 130 is operable to determine the high-resolution time of arrival by adjusting the low-resolution time of arrival according to the time of arrival adjustment value generated by the interpolation circuit.

While the interpolation circuit 10 has been described herein as generating a time of arrival adjustment value corresponding to a rising edge of the signal, the circuit 10 may also be used to determine other signal events as well. The circuit 10 may be used, for example, to generate a time of arrival adjustment value corresponding to a falling edge of the signal without modifying the circuit 10 as illustrated and described. If the circuit 10 is used to generate a time of arrival adjustment value corresponding to a falling edge, however, the outputs 100 through 112 of the third stage 68 of the intermediate value calculator 12 would be reversed such that the one-eighth point output 100 would actually hold the seven-eighths point value, the one-fourth point output 102 would actually hold the three-fourths point value, and so forth. Thus, the decoder circuit 16 would need to be programmed accordingly. Furthermore, the interpolation circuit 10 is not limited to use with RF signals, but may be used with signals of a virtually any frequency communicated through virtually any medium.

APPENDIX A

```
SUBDESIGN toa_high_res_dcd
    (
HPLE78          : INPUT; % Input data from the seven eights comparison %
HPLE34          : INPUT; % Input data from the three fourths comparison %
HPLE58          : INPUT; % Input data from the five eights comparison %
HPLE12          : INPUT; % Input data from the one half comparison %
HPLE38          : INPUT; % Input data from the three eights comparison %
HPLE14          : INPUT; % Input data from the one fourth comparison %
HPLE18          : INPUT; % Input data from the one eight comparison %
    RESETN      : INPUT; % Reset %
    CLK         : INPUT; % Clk %
    HTOA_RES [2 . . 0]      : OUTPUT; % High resolution bits %
)
VARIABLE
            HTOA_RES [2 . . 0] : DFF;
            SEL [2 . . 0] : NODE;
BEGIN
        DEFAULTS
            SEL [ ] = GND;
        END DEFAULTS;
        HTOA_RES [ ] . d = SEL [ ];
        HTOA_RES [ ] . clk = CLK;
        HTOA_RES [ ] . clrn = RESETN;
        HTOA_RES [ ] . prn = VCC;
TABLE
        HPLE18, HPLE14, HPLE38, HPLE12, HPLE58, HPLE34, HPLE78 => SEL[2 . . 0];
          1 ,     1 ,     1 ,     1 ,     1 ,     1 ,     1    =>  H"7" ;
          0 ,     1 ,     1 ,     1 ,     1 ,     1 ,     1    =>  H"6" ;
          0 ,     0 ,     1 ,     1 ,     1 ,     1 ,     1    =>  H"5" ;
          0 ,     0 ,     0 ,     1 ,     1 ,     1 ,     1    =>  H"4" ;
          0 ,     0 ,     0 ,     0 ,     1 ,     1 ,     1    =>  H"3" ;
          0 ,     0 ,     0 ,     0 ,     0 ,     1 ,     1    =>  H"2" ;
          0 ,     0 ,     0 ,     0 ,     0 ,     0 ,     1    =>  H"1" ;
          0 ,     0 ,     0 ,     0 ,     0 ,     0 ,     0    =>  H"0" ;
END TABLE;
END;
```

Having thus described a preferred embodiment of the invention, what is claimed as new and desired to be protected by Letters Patent includes the following:

1. A system for determining the arrival time of a signal event, the system comprising:

an intermediate value calculator for receiving two samples of the signal, wherein a first sample includes a first amplitude value and a first time of arrival and a second sample includes a second amplitude value and a second time of arrival, and for defining a plurality of intermediate values between the first amplitude value and the second amplitude value;

a comparator for receiving a threshold value and the plurality of intermediate values, comparing each intermediate value to the threshold value, and generating a comparison result for each comparison; and a decoder for generating a time of arrival adjustment value based on the comparison results, the first time of arrival, and the second time of arrival.

2. The system as set forth in claim 1, wherein the intermediate value calculator defines three intermediate amplitude values linearly related to the first amplitude value and the second amplitude value.

3. The system as set forth in claim 2, wherein the intermediate value calculator includes a first section for generating a one-half amplitude value that is approximately the average of the first amplitude value and the second amplitude value.

4. The system as set forth in claim 3, wherein the intermediate value calculator further includes— a second section for generating a three-fourths amplitude value that is approximately the average of the one-half amplitude value and the second amplitude value, and a third adder for generating a one-fourth amplitude value that is approximately the average of the one-half amplitude value and the first amplitude value.

5. The system as set forth in claim 1, wherein the intermediate value calculator circuit defines seven intermediate amplitude values linearly related to the first amplitude value and the second amplitude value.

6. The system as set forth in claim 5, wherein the intermediate value calculator includes— a first section for generating a one-half amplitude value that is approximately the average of the first and second amplitude values;

a second section for generating a three-fourths amplitude value that is approximately the average of the one-half amplitude value and the second amplitude value;

a third section for generating a one-fourth amplitude value that is approximately the average of the one-half amplitude value and the first amplitude value;

a fourth section for generating a seven-eighths amplitude value that is approximately the average of the three-fourths amplitude value and the second amplitude value;

a fifth section for generating a five-eighths amplitude value that is approximately the average of the one-half amplitude value and the three-fourths amplitude value;

a sixth section for generating a three-eighths amplitude value that is approximately the average of the one-fourth amplitude value and the one-half amplitude value; and a seventh section for generating a one-eighth amplitude value that is approximately the average of the one-fourth amplitude value and the first amplitude value.

7. The system as set forth in claim 1, wherein the time of arrival adjustment value is approximately equal to a difference between the first time of arrival and the second time of arrival multiplied by a fraction corresponding to the smallest intermediate value that is greater than the threshold value.

8. The system as set forth in claim 1, wherein the comparator includes a plurality of comparator circuits, wherein each comparator circuit receives the threshold value and one of the intermediate values, compares the intermediate value to the threshold value, and generates a comparison result.

9. The system as set forth in claim 1, further comprising:

an antenna; and a detection circuit for receiving a raw signal from the antenna, filtering the signal, converting the signal to digital format, and communicating the two samples of the signal to the intermediate value calculator.

10. The system as set forth in claim 1, wherein the intermediate value calculator is operable to selectively receive the signal samples in one of a plurality of formats.

11. The system as set forth in claim 10, wherein the plurality of formats are chosen from the group consisting of two point averaged data, four-point averaged data, and eight-point averaged data.

12. The system as set forth in claim 1, further comprising a time of arrival adjuster circuit for subtracting the time of arrival adjustment value from the second time of arrival to generate a high-resolution time of arrival value.

13. The system as set forth in claim 12, further comprising:

a first synchronization signal input for receiving an indicator of a first signal event; and a first memory element in communication with the first synchronization signal input and for storing the high-resolution time of arrival value upon receiving the indicator of the first signal event.

14. The system as set forth in claim 13, wherein the first signal event is a rising edge of the signal.

15. The system as set forth in claim 13, further comprising:

a second synchronization signal input for receiving an indicator of a second signal event; and a second memory element in communication with the second synchronization signal input for receiving and storing the value stored in the first memory element upon receiving the indicator of the second signal event.

16. The system as set forth in claim 15, wherein the second signal event is a falling edge of the signal.

17. An electronic circuit for determining the arrival time of a signal event, the circuit comprising:

a first circuit stage for receiving a first signal sample with a first amplitude value and a first time of arrival, receiving a second signal sample with a second amplitude value and a second time of arrival, and determining a one-half amplitude value by adding the first and second amplitude values and dividing the result by two;

a second circuit stage for determining a one-fourth amplitude value by adding the first amplitude value to the one-half amplitude value and dividing the result by two, and for determining a three-fourths amplitude value by adding the second amplitude value to the one-half amplitude value and dividing the result by two; and a third circuit stage for comparing the one-fourth, one-half, and three-fourths amplitude values to a threshold amplitude value and generating a time of arrival adjustment value based on the comparisons.

18. The circuit as set forth in claim 17, wherein the time of arrival adjustment value is equal to zero if the threshold amplitude point is greater than the three-fourths amplitude value, the time of arrival adjustment value is T×¼ if the threshold amplitude value is less than the three-fourths amplitude value and greater than the one-half amplitude value, the time of arrival adjustment value is T×½ if the threshold amplitude value is less than the one-half amplitude value and greater than the one-fourth amplitude value, and the time of arrival adjustment value is T×¾ if the threshold amplitude value is less than the one-fourth amplitude value, wherein T is the difference between the first time of arrival and the second time of arrival.

19. The circuit as set forth in claim 17, wherein the time of arrival adjustment value is equal to zero if the threshold amplitude point is less than the one-fourth amplitude value, the time of arrival adjustment value is T×¼ if the threshold amplitude value is greater than the one-fourth amplitude value and less than the one-half amplitude value, the time of arrival adjustment value is T×½ if the threshold amplitude value is greater than the one-half amplitude value and less than the three-fourths amplitude value, and the time of arrival adjustment value is T×¾ if the threshold amplitude value is greater than the three-fourths amplitude value, wherein T is the difference between the first time of arrival and the second time of arrival.

20. The circuit as set forth in claim 17, further comprising a fourth stage for determining a high-resolution time of arrival by subtracting the time of arrival adjustment value from the second time of arrival.

21. The circuit as set forth in claim 17, further comprising a fourth stage for determining a one-eighth amplitude value by adding the first amplitude value to the one-fourth amplitude value and dividing the result by two, for determining a three-eighths amplitude value by adding the one-fourth amplitude value to the one-half amplitude value and dividing the result by two, for determining a five-eighths amplitude value by adding the one-half amplitude value to the three-fourths amplitude value and dividing the result by two, and for determining a seven-eighths amplitude value by adding the three-fourths amplitude value to the second amplitude value and dividing the result by two.

22. The circuit as set forth in claim 21, wherein the third stage compares the one-eighth, one-fourth, three-eighths, one-half, five-eighths, three-fourths, and seven-eighths amplitude values to the threshold amplitude value and generates the time of arrival adjustment value based on the comparisons.

23. The circuit as set forth in claim 22, further comprising a fifth stage for determining a high resolution time-of-arrival by subtracting the time of arrival adjustment value from the second time of arrival.

24. The circuit as set forth in claim 23, wherein the time of arrival adjustment value is determined by multiplying a time period delineated by the first time of arrival and the second time of arrival by a fraction corresponding to the smallest intermediate amplitude value that is greater than the threshold value.

25. The circuit as set forth in claim 17 further comprising a system clock, wherein the first stage corresponds to a first clock event, the second stage corresponds to a second clock event, and the third stage corresponds to a third clock event.

26. The circuit as set forth in claim 17, further comprising:

a first synchronization signal input for receiving an indicator of a first signal event; and a first memory element in communication with the first synchronization signal input and for storing the high-resolution time of arrival value upon receiving the indicator of the first signal event.

27. The circuit as set forth in claim 26, wherein the first signal event is a rising edge of the signal.

28. The circuit as set forth in claim 26, further comprising:

a second synchronization signal input for receiving an indicator of a second signal event; and a second memory element in communication with the second synchronization signal input for receiving and storing the value stored in the first memory element upon receiving the indicator of the second signal event.

29. The circuit as set forth in claim 28, wherein the second signal event is a falling edge of the signal.

30. An electronic circuit for determining the arrival time of a signal event, the circuit comprising:

a system clock for generating a clock signal characterized by clock events;

a first stage including— a signal input, a first memory element for receiving a value from the signal input and storing the value upon the occurrence of a first clock event, and a first adder for receiving the stored value from the first memory element and a value from the signal input and adding the two values to generate a first added value;

a second stage including— a second memory element for receiving the first added value and storing the first added value upon the occurrence of a second clock event, a third memory element for receiving the stored value from the first memory element and storing the value upon the occurrence of the second clock event, and a second adder for receiving the stored values from the second and third memory elements and adding the two values to generate a second added value;

a third adder for receiving the stored values from the first memory element and the second memory element and adding the two values to generate a third added value;

a third stage including— a fourth memory element for receiving the stored value from the third memory element and storing the value upon the occurrence of a third clock event, and a fifth memory element for receiving and storing a portion of the second added value upon the occurrence of the third clock event, a fourth adder for receiving the stored values from the fourth and fifth memory elements and adding the values to generate a fourth added value, a sixth memory element for receiving the stored value from the second memory element and storing the value upon the occurrence of the third clock event, a fifth adder for receiving the stored values from the fifth an sixth memory elements and adding the values to generate a fifth added value, a seventh memory element for receiving and storing a portion of the third added value upon the occurrence of the third clock event, a sixth adder for receiving the stored values from the sixth and seventh memory elements and adding the values to generate a sixth added value, and a seventh adder for receiving the stored values of the third and seventh memory elements and generating a seventh added value; and a fourth stage including— a comparator for comparing at least a portion of each of the fourth, fifth, sixth, and seventh added values to a threshold value, for comparing at least a portion of each of the stored values of the fifth, sixth, and seventh memory elements to the threshold value, and generating an output indicating whether each of the values compared to the threshold value is greater than the threshold value, and a decoder circuit for receiving the output from the comparator, determining the smallest value that is larger than the threshold value, and generating an output representing a difference between a sample time of arrival and a time corresponding to the greatest value that is larger than the threshold value.

* * * * *